United States Patent [19]

Hooykaas

[11] Patent Number: 5,498,285
[45] Date of Patent: Mar. 12, 1996

[54] PROCESS FOR THE SYNTHESIS OF A LAYERED, CLAY-LIKE MATERIAL AS WELL AS ITS USE

[75] Inventor: Carel W. J. Hooykaas, Rotterdam, Netherlands

[73] Assignee: Pelt & Hooykaas B.V., Rotterdam, Netherlands

[21] Appl. No.: 163,510

[22] Filed: Dec. 9, 1993

[30] Foreign Application Priority Data

Dec. 29, 1992 [NL] Netherlands .......................... 9202277

[51] Int. Cl.$^6$ .......................... C04B 33/02; C01B 33/26; C01B 33/32
[52] U.S. Cl. .......................... 106/486; 106/483; 501/141; 588/249; 588/252; 502/74; 502/80; 502/84; 502/85; 423/328.1
[58] Field of Search .................................. 106/482, 483, 106/486; 501/141; 405/128; 588/249, 252; 502/60, 74, 80, 84, 85; 423/328.1

[56] References Cited

U.S. PATENT DOCUMENTS 4,600,514 7/1986 Conner .................................. 405/129

FOREIGN PATENT DOCUMENTS

| | | |
|---|---|---|
| 2063395 | 1/1991 | Canada . |
| 0180354 | 5/1986 | European Pat. Off. . |
| 0301858 | 2/1989 | European Pat. Off. . |
| 0408545 | 1/1991 | European Pat. Off. . |
| 133599 | 10/1971 | Netherlands . |
| 1560504 | 2/1980 | United Kingdom . |
| 9112204 | 8/1991 | WIPO . |

*Primary Examiner*—Mark L. Bell
*Assistant Examiner*—Michael Marcheschi
*Attorney, Agent, or Firm*—Edmund M. Jaskiewicz

[57] ABSTRACT

The invention relates to a process for the synthesis of a layered, clay-like material starting from a silicon oxide containing material in a finely divided state by reacting a glass phase containing material at a pH from 5 to 8, in the presence of water, with a source of layer-forming metal ions and an activator for the formation of clay under atmospheric conditions to obtain a material with a stable structure. Preferably aluminium and/or magnesium ions are employed as layer-forming metal ions. Furthermore, according to a suitable embodiment, boron glass or cullet is employed as a material containing silicon oxide. The conversion of the mixture of materials into a substance having an ordered structure takes place preferably at a pH of approximately 7 and a temperature of 30°–45° C., in which the starting materials appropriately have a particle size of approximately 100 microns. An activator for the formation of clay is added to accelerate the process of conversion. Moreover, if desired, a clay modifier can be added. As starting mixture, a hearth ash containing a glass fraction obtained by incinerating household and industrial waste can be employed; this hearth ash proves to be a useful secondary raw material. By means of the present process waste material, whether subjected to incineration or not, that has been polluted with inorganic material can be immobilized.

13 Claims, No Drawings

PROCESS FOR THE SYNTHESIS OF A LAYERED, CLAY-LIKE MATERIAL AS WELL AS ITS USE

BACKGROUND OF THE INVENTION

The invention relates to a process for the preparation of a layered, clay-like material using a silicon oxide containing material in a finely divided state as a starting material.

It should be noted that the clay minerals occurring in nature are generated through the erosion of rocks and sediments. Such erosion processes appear to be accellerated under hydrothermal conditions.

Thus, such a hydrothermal process is known from GB-A-1- 560 504, wherein by hydrothermal treatment of igneous rocks, clay-like materials are obtained.

On the other hand, the synthesis of a layered material under hydrothermal conditions is also known. The Derwent abstract AN 91-183100, week 9125 & JP,A,3 112 808, disclose the hydrothermal synthesis of a layered silicate. More specifically, an amorphous silica-containing material, an alkali metal source, water and alcohol are according to these references reacted under hydrothermal conditions at at least 150° C. A source of alumina or of magnesia can further also be present.

Hydrothermal processes nevertheless require special equipments.

Clay materials are responsible for many natural conversion processes, including reactions involving oxidation and hydrolysis. They can bind heavy metals because they have a net negative charge, which is compensated by interchangeable cations. In nature these are mainly the ions of alkaline earth metals.

On the other hand, it is possible to modify clay minerals such that their original affinity will change from hydrophilic to hydrophobic. Because of that the clay becomes suitable for the adsorption of organic compounds which dissolve poorly in water.

At the moment a very important application of clay, whether it has been modified or not, lies then in the field of the immobilization of polluted industrial waste material, in which the waste material is adsorbed by the clay and then isolated by incorporation into a cement matrix.

Due to the growing amount of industrial waste material as well as the requirements, which are becoming more and more strict, concerning the amount of waste material allowed to be discharged into the environment, there is an increasing need for a clay-like material that also has the capacity to absorb different substances that clay inherently possesses.

SUMMARY OF THE INVENTION

Surprisingly, a process has now been found for the preparation of a layered, clay-like material in which it is not necessary to appeal to natural sources of clay, nor to appeal to a hydrothermal process.

More specifically the process according to the invention comprises the formation of a layered, clay-like material by reacting a glass phase containing material at a pH from 5 to 8, in the presence of water with a source of layer-forming metal ions, and an activator for the formation of clay, under atmospheric conditions to obtain a material having a stable structure.

It should be noted that the fineness of the various constituents may vary within a wide range of limits. However, it will be obvious that the smaller the size of the particles is, the faster the velocity of conversion will be. Actual practice has shown that a particle size of approximately 100 microns is very suitable.

Preferably aluminium ions are employed as layer-forming metal ions. The source concerned of such ions may in that case consist of aluminum oxide. However, it may also be appropriate to employ magnesium ions as layer-forming metal ions. Advantageously, magnesium oxide is employed then.

Preferably a clay-like material is formed using boron glass or waste glass as starting material. Boron glass has the advantage that in addition to boric oxide ($B_2O_3$), both silicon dioxide and aluminum oxide are present, which also form the structural elements from which clay is built up. Waste glass is known in English-speaking countries as cullet. It is employed as a fluidizing agent in the manufacture of glass because it lowers the temperature at which the mixture employed for the manufacture of glass becomes fluid. Although the mechanism underlying the present invention is not entirely clear, it is assumed that it is this property of cullet that makes it possible for the conversion into a stable ordered structure, consequently the clay-like material, to take place relatively quickly.

Preferably the transformation that occurs in the present process is allowed to take place at a pH of approximately 7 and at a temperature of approximately 35°–40° C.

It should be noted that a pH of at least 5, and preferably 7, is fairly essential in the present process. The fact is that at a lower pH of, for example, 1 to 3 a silicate employed as a material containing silicon oxide will be converted into a silicic acid polymer, such as is disclosed in U.S. Pat. No. 4,404,105, from which it is no longer possible to form a material having a stable ordered structure with the characteristics of clay.

The application of a temperature of 30°–45° C. is favourable for obtaining a fairly rapid conversion. Although this range is not very critical, it will be obvious that at a lower temperature the reaction velocity will also be lower, while at a temperature above 45° C. the reaction velocity will indeed have increased, but that this can be such that it will become impossible to obtain an ordered structure that is present throughout the whole final product due to the formation of impermeable films on the various reagents.

Furthermore, an activator is employed preferably for the formation of clay in order to accelerate the conversion process for the formation of a material with a stable ordered structure. Transition metal compounds such as magnesium sulphate, ferrous sulphate and manganese oxide have proven to be very suitable for employment as an activator.

A clay modifier is further added to the mixture of starting substances to be converted. Preferably a calcium compound is employed as a clay modifier.

An embodiment of the process according to the invention that particularly deserves preference includes the employment of a hearth ash containing a glass fraction, obtained through the incineration of household or industrial waste, for the formation of a clay-like material with a stable ordered structure.

It should be noted that the composition of such a hearth ash depends on the waste material supplied and the process conditions implemented, and consequently is inconstant. At present this hearth ash is mainly employed in fills, in road foundations and as an aggregate in concrete. There is no application for the remainder (approximately 150,000 tons a year) as a result of which it has to be dumped. The problem with hearth ash is that it contains heavy metals, which upon leaching pollute the environment in an extremely undesirable way.

Surprisingly, it has now been found that hearth ash can be employed as a raw material for the formation of a layered, clay-like material by utilizing the glass fraction present in hearth ash. The metallic elements of hearth ash prove to be incorporated or absorbed into the clay matrix. Thus a fixation of the hazardous metallic elements is obtained. By subsequently incorporating the formed, layered, clay-like material into a cement matrix, a building material is obtained in which the various metallic elements are no longer perceptible in the leaching tests carried out.

Furthermore, the invention relates to a layered, clay-like material obtained by having waste, which is polluted with inorganic compounds and subjected to incineration, in a pulverized state at a mainly neutral pH, a temperature of 30°–45° C. and in the presence of water is reacted with a pulverized, mainly amorphous, silicon oxide source.

The amorphous silicon oxide source present in this may be a glass fraction that is already present in the material, which has been subjected to incineration. In that case, a very valuable product is obtained from waste material.

If, however, the waste material which has been subjected to incineration has an insufficient quantity of a silicon oxide source, boron glass or cullet, for example, may be added so that the formation of the clay matrix can still take place.

Finally, the invention relates to a process for immobilizing waste material polluted with inorganic material, whether subjected to incineration or not, by incorporating the inorganic material into a layered, clay-like material obtained by applying the process according to the invention.

DESCRIPTION OF THE PREFERRED EMBODIMENTS

EXAMPLE I

So-called AVI (waste processing industry) silicate slags that were finely ground to a particle size of mainly about 100 µm were used as a starting material. AVI silicate slags are generated by burning household waste and sewage sludge and contain heavy metals as pollutants. Furthermore, these slags contain glass beads in which a part of the heavy metals has already been fixed.

A quantity of aluminum sulphate was added to the finely ground slag material and the pH of the mixture was brought up to a value of approximately 7. Furthermore, as an activator for the formation of clay, magnesium sulphate was added. The mixture thus obtained was brought up to a temperature of approximately 40° C. and brought into contact with water, in the course of which the mixture was continuously turned over.

After approximately 1 month the starting material had converted into a layered, clay-like material.

EXAMPLE II

In this example, cullet that had been finely ground to a particle size of approximately 80 µm was used as a starting material. Analysis of the cullet employed showed that the material contained approximately 3% $Al_2O_3$.

An equivalent quantity of manganese oxide was added to the finely ground cullet as well as just enough water so that the particles almost began to adhere to each other. The pH of the mixture formed was brought up to approximately 6.

By continuously turning the mixture over at a temperature of approximately 32° C. a layered, clay-like material was formed, in which the conversion was complete after approximately 5 weeks.

Adding ferrous sulphate to the mixture to be turned over resulted in completion of the conversion in approximately 3 weeks.

The clay-like material obtained had the capacity to absorb various metal salts present in an aqueous solution.

EXAMPLE III

The procedure described in Example I was repeated. The clay-like material formed was incorporated into a cement matrix of blast furnace slag cement according to the manner known per se. From the product obtained after 28 days of hardening, not a single heavy metallic element could be detected in leaching tests.

What is claimed is:

1. A process for the preparation of a layered, synthetic clay material starting from a silicon oxide containing material in a finely divided state, wherein a glass phase containing material is reacted at a pH from 5 to 8, in the presence of water, with a source of layer-forming metal ions and a transition metal compound as an activator for the formation of clay, under atmospheric conditions to obtain a material having a stable structure.

2. A process according to claim 1, wherein the layer-forming metal ions are selected from the group consisting of aluminium ions and magnesium ions.

3. A process according to claim 1, wherein the glass phase containing material is boron glass.

4. A process according to claim 1, wherein the reaction is allowed to take place at a pH of approximately 7 and at a temperature of 30°–45° C.

5. A process according to claim 1, wherein the transition metal compound is selected from the group consisting of ferrous sulphate and manganese oxide.

6. A process according to claim 1, wherein further a clay modifier is added.

7. A process according to claim 6, wherein the clay modifier used is a calcium compound.

8. A process according to claim 1, wherein the glass phase containing material is a hearth ash containing a glass fraction, obtained by incinerating household or industrial waste.

9. Layered, synthetic clay material containing a transition metal compound selected from the group consisting of ferrous sulfate and manganese oxide obtained by reacting a hearth ash containing a glass fraction, obtained by incinerating household or industrial waste, which is polluted with inorganic compounds and subjected to incineration, in a pulverized state at a mainly neutral pH, a temperature of 30°–45° C. and in the presence of water, with a pulverized, mainly amorphous, silicon oxide source.

10. Layered, synthetic clay material according to claim 9, wherein the silicon oxide source used is a silicon dioxide containing boron glass.

11. A process for immobilizing waste material polluted with inorganic material, whether subjected to incineration or not, by absorbing the inorganic material into a layered, synthetic clay material obtained by applying the process according to claim 1.

12. A process according to claim 1 wherein the glass phase containing material is cullet.

13. Layered, synthetic clay material according to claim 9 wherein the silicon oxide source used is cullet.

\* \* \* \* \*